(12) United States Patent
Arai

(10) Patent No.: US 11,031,716 B2
(45) Date of Patent: Jun. 8, 2021

(54) TERMINAL STRUCTURE FOR USE IN POWER FEEDING

(71) Applicant: Toyota Jidosha Kabushiki Kaisha, Toyota (JP)

(72) Inventor: Kunihiko Arai, Owariasahi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/663,916

(22) Filed: Oct. 25, 2019

(65) Prior Publication Data

US 2020/0136290 A1 Apr. 30, 2020

(30) Foreign Application Priority Data

Oct. 31, 2018 (JP) .............................. JP2018-205178

(51) Int. Cl.
*H01R 13/193* (2006.01)
*H01R 13/05* (2006.01)
*B60L 53/16* (2019.01)
*H01R 13/10* (2006.01)

(52) U.S. Cl.
CPC ............ *H01R 13/193* (2013.01); *B60L 53/16* (2019.02); *H01R 13/052* (2013.01); *H01R 13/10* (2013.01); *H01R 2201/26* (2013.01)

(58) Field of Classification Search
CPC ..... H01R 13/193; H01R 13/052; H01R 13/10
USPC ......................................................... 439/161
See application file for complete search history.

(56) References Cited

U.S. PATENT DOCUMENTS

| 2,923,914 | A | * | 2/1960 | Beck et al. | ............... | H01R 9/16 439/736 |
| 4,284,322 | A | * | 8/1981 | Keller | ..................... | H01R 4/183 29/857 |
| 2004/0147174 | A1 | * | 7/2004 | Chen | ..................... | H01R 13/405 439/733.1 |
| 2008/0009204 | A1 | * | 1/2008 | Wei | ......................... | H01R 4/723 439/877 |
| 2014/0349524 | A1 | * | 11/2014 | Sakamoto | .............. | H01R 31/08 439/701 |
| 2015/0303602 | A1 | | 10/2015 | Tatzel | | |
| 2018/0048090 | A1 | * | 2/2018 | Kawai | ................ | H01R 13/5812 |

FOREIGN PATENT DOCUMENTS

CN 104871370 A 8/2015
JP 2015-002106 A 1/2015

* cited by examiner

*Primary Examiner* — Alexander Gilman
(74) *Attorney, Agent, or Firm* — Dinsmore & Shohl LLP

(57) ABSTRACT

A terminal structure for use in power feeding includes a first terminal that includes a base portion and a tip portion, that has a shape extending from the base portion to the tip portion along an axis of the first terminal, and that is insertable into and removable from a second terminal, which is tubular. At a predetermined temperature, the first terminal has a first form in which an outer dimension of the tip portion is smaller than that of the base portion when viewed in a direction of a central axis of the first terminal. When a temperature of the first terminal exceeds the predetermined temperature, the first terminal deforms into a second form in which an outer dimension of the tip portion is larger than that of the tip portion of the first form when viewed in a direction of the central axis of the first terminal.

11 Claims, 8 Drawing Sheets

TERMINAL STRUCTURE FOR USE IN POWER FEEDING

CROSS REFERENCE TO RELATED APPLICATIONS

This nonprovisional application claims priority to Japanese Patent Application No. 2018-205178 filed on Oct. 31, 2018, with the Japan Patent Office, the entire contents of which are hereby incorporated by reference.

BACKGROUND

Field

The present disclosure relates to a terminal structure for use in power feeding.

Description of the Background Art

For example, Japanese Patent Laying-Open No. 2015-2106 discloses a connector that has a pin-shaped male terminal and a female terminal. The female terminal consists of a coil spring, which has an inner diameter smaller than the outer diameter of the male terminal in a free state but becomes capable of receiving insertion of the male terminal thereinto when enlarged in diameter. To the male terminal and the female terminal, a diameter enlarging mechanism is provided. This mechanism compresses and twists the coil spring to elastically enlarge the diameter of the coil spring during insertion of the male terminal into the coil spring; and when the insertion is completed, the mechanism releases the diameter enlargement to allow the coil spring to shrink in diameter under elastic restoring force.

SUMMARY

In the connector disclosed by the above-described Japanese Patent Laying-Open No. 2015-2106, the above-mentioned diameter enlarging mechanism is provided to the male terminal and the female terminal for the purpose of minimizing the resistance that occurs between the male terminal and the female terminal due to insertion while ensuring the contact force between the male terminal and the female terminal.

When a high electric current is passed through the connector with this configuration, the area of contact between the male terminal and the female terminal needs to be large. However, because an electric current passing through the connector raises the temperature of the female terminal and accordingly decreases the elastic modulus of the coil spring, which is the female terminal, the contact force between the male terminal and the female terminal can become insufficient and thereby the area of contact between the male terminal and the female terminal can decrease.

An object of the present disclosure is to solve the above-described problem by providing a terminal structure for use in power feeding that makes it possible to minimize the resistance that occurs between the terminals due to insertion and removal while ensuring a sufficient amount of area of contact between the terminals during electric current passage.

The terminal structure for use in power feeding according to the present disclosure includes a first terminal. The first terminal includes a base portion and a tip portion. The first terminal has a shape extending from the base portion to the tip portion along an axis of the first terminal. The first terminal is insertable into and removable from a second terminal, which is tubular. At a predetermined temperature, the first terminal has a first form in which an outer dimension of the tip portion is smaller than an outer dimension of the base portion when viewed in a direction of a central axis of the first terminal. When a temperature of the first terminal exceeds the predetermined temperature, the first terminal deforms into a second form in which an outer dimension of the tip portion is larger than the outer dimension of the tip portion of the first form when viewed in a direction of the central axis of the first terminal.

In the terminal structure for use in power feeding with this configuration, the first terminal at the predetermined temperature has the first form in which an outer dimension of the tip portion is smaller than an outer dimension of the base portion and this first form makes it possible to minimize the resistance that occurs between the first terminal and the second terminal due to insertion and removal. As an electric current passes through the terminal structure for use in power feeding, the temperature of the first terminal rises. When this occurs and causes the temperature of the first terminal to exceed the predetermined temperature, the first terminal deforms into the second form in which an outer dimension of the tip portion is larger than the outer dimension of the tip portion of the first form. This deformation makes it possible to ensure a sufficient amount of area of contact between the first terminal and the second terminal during electric current passage.

In some embodiments, the tip portion includes the following: an outer circumferential part, which is tubular and is composed of a first metal; and an inner circumferential part, which is bonded to an interior side of the outer circumferential part and is composed of a second metal, which has a coefficient of thermal expansion higher than a coefficient of thermal expansion of the first metal. The first terminal has a plurality of slits extending in a direction of the central axis of the first terminal. The plurality of slits divide the outer circumferential part and the inner circumferential part in a circumferential direction around the central axis of the first terminal into a plurality of sections.

In the terminal structure for use in power feeding with this configuration, a rise in the temperature of the first terminal causes thermal expansion of the inner circumferential part to an extent that is greater than the thermal expansion of the outer circumferential part and, thereby, causes the tip portion to deform and warp outwardly in a radial direction about the central axis of the first terminal. This deformation enables the first terminal to deform into the second form in which an outer dimension of the tip portion is larger than the outer dimension of the tip portion of the first form.

In some embodiments, the tip portion includes the following: an outer circumferential part, which is tubular and is deformable in a radial direction about the central axis of the first terminal; and an inner circumferential part, which is located on an interior side of the outer circumferential part and has a volume progressively increasing outwardly in a radial direction about the central axis of the first terminal along with a rise in temperature.

In the terminal structure for use in power feeding with this configuration, a rise in the temperature of the first terminal causes an increase in the volume of the inner circumferential part and, thereby, causes the outer circumferential part to be pushed by the inner circumferential part outwardly in a radial direction about the central axis of the first terminal. This deformation enables the first terminal to deform into the second form in which an outer dimension of the tip portion is larger than the outer dimension of the tip portion of the first form.

In some embodiments, the terminal structure for use in power feeding further includes the second terminal, which is tubular. When the first terminal in connection with the second terminal deforms into the second form, the tip portion comes into contact with an inner circumferential surface of the second terminal.

The terminal structure for use in power feeding with this configuration makes it possible to ensure a sufficient amount of area of contact between the first terminal and the second terminal during electric current passage.

In some embodiments, the second terminal includes a plurality of slits extending in a direction of a central axis of the second terminal and arranged in a circumferential direction around the central axis of the second terminal.

The terminal structure for use in power feeding with this configuration makes it possible for the second terminal, during deformation of the first terminal from the first form into the second form, to readily deform to fit the outer dimension of the tip portion of the first terminal. As a result, the area of contact between the first terminal and the second terminal may be further increased.

The foregoing and other objects, features, aspects and advantages of the present disclosure will become more apparent from the following detailed description of the present disclosure when taken in conjunction with the accompanying drawings.

DETAILED DESCRIPTION

Figure 1:
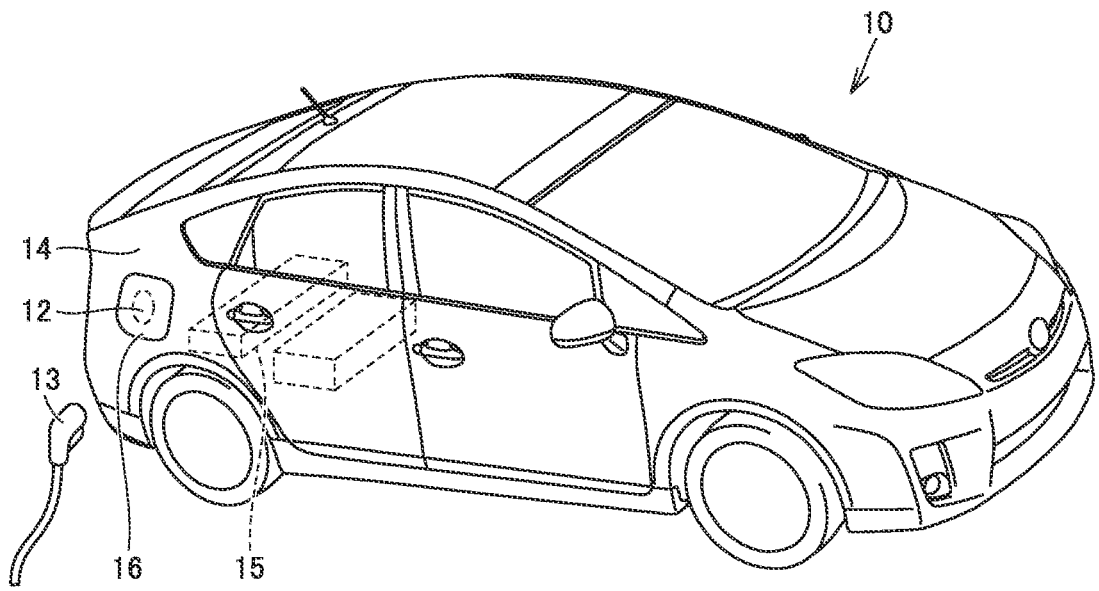
FIG. 1 is a perspective view of a vehicle.

A description will be given of embodiments of the present disclosure, with reference to drawings. In the drawings referenced below, the same or equivalent members are denoted by the same numeral.

Embodiment 1

FIG. 1 is a perspective view of a vehicle. Referring to FIG. 1, a vehicle 10 is an externally chargeable plug-in hybrid vehicle or electric vehicle.

Vehicle 10 includes a connector 12, an outer body 14, a battery 15, and a cap 16. Cap 16 is disposed on outer body 14 in such a way that cap 16 can be opened and closed. When cap 16 is opened, connector 12 is exposed. When a plug 13 at a power-feeding facility (a charging station) is connected to connector 12, electric power is fed to battery 15.

The amount of electric power fed to vehicle 10 may be 100 kW or higher (for example, 400 A in electric current and 400 V in voltage) or may be 300 kW or higher (for example, 400 A in electric current and 1000 V in voltage).

Figure 2:
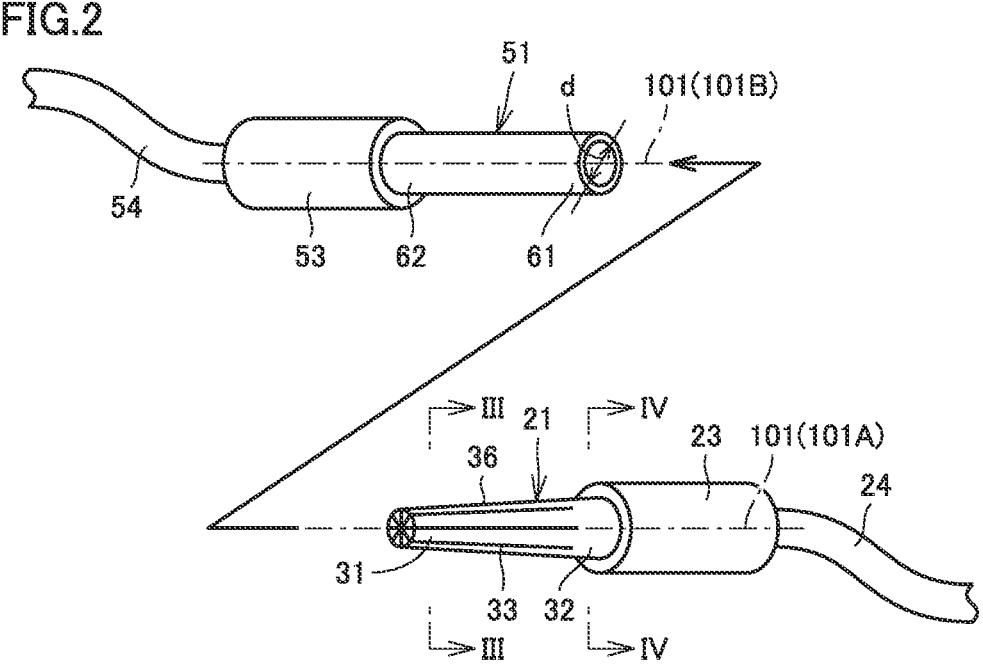
FIG. 2 is a perspective view of a terminal structure for use in power feeding according to Embodiment 1 (without connection between a first terminal and a second terminal).

FIG. 2 is a perspective view of a terminal structure for use in power feeding according to Embodiment 1 (without connection between a first terminal and a second terminal). Referring to FIGS. 1 and 2, the terminal structure for use in power feeding according to the present embodiment includes a first terminal 21 and a second terminal 51. First terminal 21 is a male terminal. Second terminal 51 is a female terminal. First terminal 21 is configured to be insertable into and removable from second terminal 51.

The terminal structure for use in power feeding according to the present embodiment is a terminal structure for use in charging vehicles, and is typically used to connect a vehicle with a power-feeding facility. For instance, first terminal 21 is provided to one of connector 12 and plug 13 and second terminal 51 is provided to the other of connector 12 and plug 13.

First terminal 21 and second terminal 51 are made of metal. First terminal 21 is connected to a cable 24 via a swaging member 23. Swaging member 23 is a cylindrical metal part. Both ends of swaging member 23 in an axial direction are swaged and fixed to first terminal 21 and cable 24, respectively.

First terminal 21 includes a base portion 32 and a tip portion 31. First terminal 21 has a shape extending from base portion 32 to tip portion 31 along its axis. First terminal 21 is like a pin extending out of swaging member 23 along a hypothetical central axis 101A. Base portion 32 refers to a base-side portion of first terminal 21 extending out of swaging member 23. Tip portion 31 refers to a tip-side portion of first terminal 21 extending out of swaging member 23 along central axis 101A.

A cross section of first terminal 21 orthogonal to central axis 101A is circular.

Second terminal 51 is connected to a cable 54 via a swaging member 53. Swaging member 53 is a cylindrical metal part. Both ends of swaging member 53 in an axial direction are swaged and fixed to second terminal 51 and cable 54, respectively.

Second terminal 51 includes a base portion 62 and a tip portion 61. Second terminal 51 is tubular extending from base portion 62 to tip portion 61. Second terminal 51 extends in a cylindrical fashion out of swaging member 53 along a hypothetical central axis 101B. Base portion 62 refers to a base-side portion of second terminal 51 extending out of swaging member 53. Tip portion 61 refers to a tip-side portion of second terminal 51 extending out of swaging member 53 along central axis 101B.

A cross section of second terminal 51 orthogonal to central axis 101B is circular like a ring.

Figure 3:
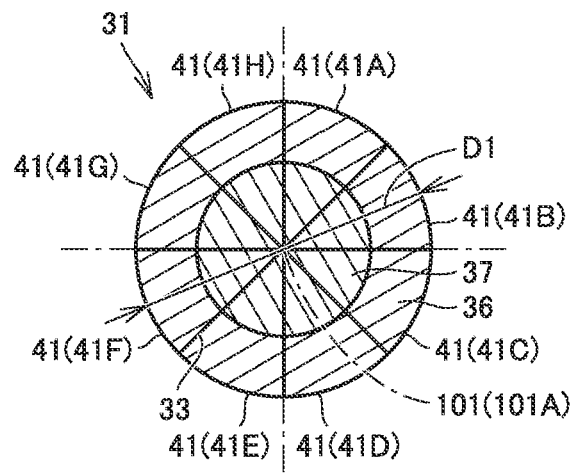
FIG. 3 is a sectional view of the first terminal along the line III-III shown in FIG. 2 and viewed in a direction indicated by the arrows shown in FIG. 2.
Figure 4:
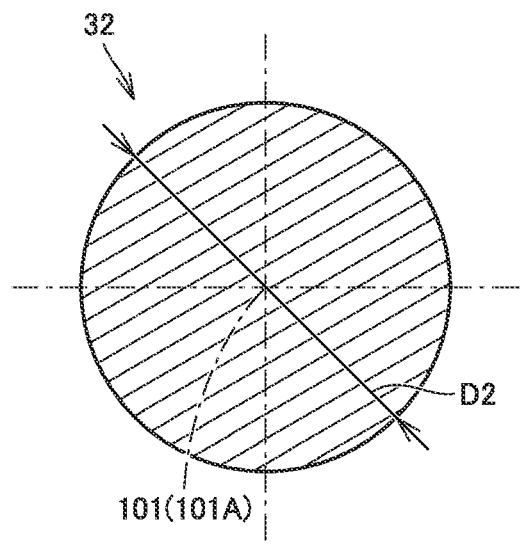
FIG. 4 is a sectional view of the first terminal along the line IV-IV shown in FIG. 2 and viewed in a direction indicated by the arrows shown in FIG. 2.

FIG. 3 is a sectional view of the first terminal along the line III-III shown in FIG. 2 and viewed in a direction indicated by the arrows shown in FIG. 2. FIG. 4 is a sectional view of the first terminal along the line IV-IV shown in FIG. 2 and viewed in a direction indicated by the arrows shown in FIG. 2.

Referring to FIGS. 2 to 4, first terminal 21 has a first form at a predetermined temperature. In the first form, an outer dimension of tip portion 31 is smaller than an outer dimension of base portion 32 when viewed in a direction of central axis 101A of first terminal 21. The predetermined temperature is a temperature that depends on the ambient temperature of the space where first terminal 21 is present. The outer dimension of tip portion 31 is the maximum outer dimension of tip portion 31 measured along a straight line that passes through central axis 101A. The outer dimension of base portion 32 is the maximum outer dimension of base portion 32 measured along a straight line that passes through central axis 101A.

In the first form, as shown in FIG. 3, the circular cross section of tip portion 31 orthogonal to central axis 101A has a diameter D1 smaller than an inner diameter d of the tubular second terminal 51 (D1<d), and, as shown in FIG. 4, the circular cross section of base portion 32 orthogonal to central axis 101A has a diameter D2 larger than diameter D1 (D1<D2). Diameter D2 is equal to or greater than inner diameter d of second terminal 51 (D2≥d).

First terminal 21 has a tapered shape having a cross sectional area decreasing progressively from base portion 32 toward tip portion 31 in a direction of central axis 101A.

Figure 5:
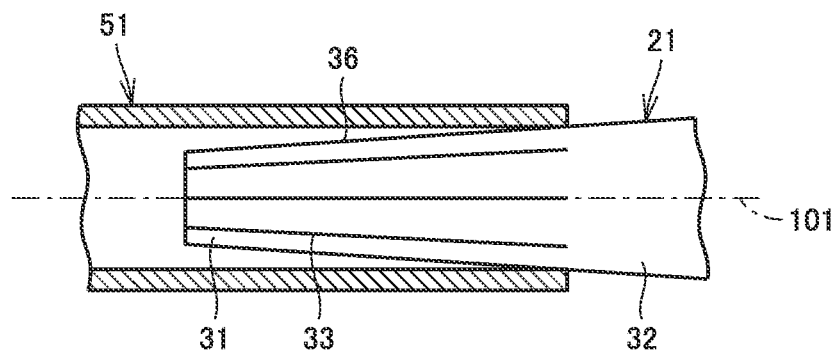
FIG. 5 is a sectional view of the terminal structure for use in power feeding according to Embodiment 1 (with connection between the first terminal and the second terminal).

FIG. 5 is a sectional view of the terminal structure for use in power feeding according to Embodiment 1 (with connection between the first terminal and the second terminal).

Referring to FIG. 5, inserting first terminal 21 into the interior of the tubular second terminal 51 makes first terminal 21 and second terminal 51 become connected with each other.

First terminal 21 and second terminal 51 that are connected with each other are concentrically located about a central axis 101. Between tip portion 31 of first terminal 21 and second terminal 51, there is a gap in a radial direction about central axis 101. Base portion 32 of first terminal 21 and second terminal 51 are in contact with each other in such a way that the contact area between them forms a line corresponding to a circumference around central axis 101.

Pulling first terminal 21 out of second terminal 51 makes first terminal 21 and second terminal 51 become separated from each other.

Figure 6:
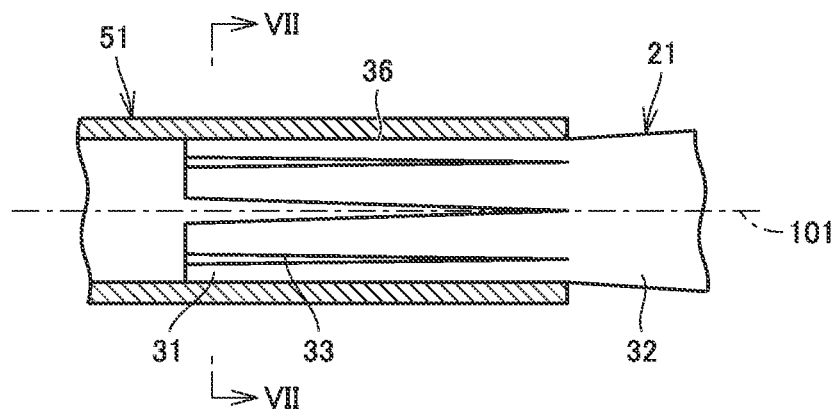
FIG. 6 is a perspective view of the terminal structure for use in power feeding according to Embodiment 1 (during electric current passage).
Figure 7:
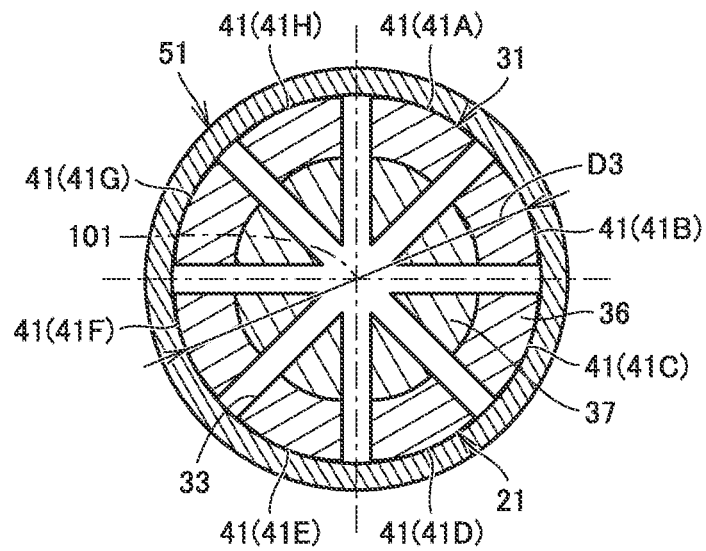
FIG. 7 is a sectional view of the first terminal and the second terminal along the line VII-VII shown in FIG. 6 and viewed in a direction indicated by the arrows shown in FIG. 6.

FIG. 6 is a perspective view of the terminal structure for use in power feeding according to Embodiment 1 (during electric current passage). FIG. 7 is a sectional view of the first terminal and the second terminal along the line VII-VII shown in FIG. 6 and viewed in a direction indicated by the arrows shown in FIG. 6. FIGS. 6 and 7 illustrate first terminal 21 and second terminal 51 during electric current passage through the terminal structure for use in power feeding.

Referring to FIGS. 6 and 7, an electric current passing through the terminal structure for use in power feeding causes a rise in the temperature of first terminal 21 above the predetermined temperature. When the temperature of first terminal 21 exceeds the predetermined temperature, first terminal 21 deforms into a second form in which an outer dimension of tip portion 31 is larger than the outer dimension of tip portion 31 of the first form when viewed in a direction of central axis 101 of first 6 terminal 21.

In the second form, as shown in FIG. 7, the circular cross section of tip portion 31 orthogonal to central axis 101A has a diameter D3 greater than diameter D1 (D3>D1). In some embodiments, diameter D3 is equal to inner diameter d of second terminal 51 (D3=d).

When vehicle 10 is charged very rapidly, among other occasions, the charging is carried out at a high voltage and a high electric current. In this type of charging accompanied by passage of a large amount of electric current through first terminal 21 and second terminal 51, there is a need for increasing the area of contact between first terminal 21 and second terminal 51 to decrease electrical resistance and to thereby reduce heat production. However, simply increasing the area of contact between the terminals would increase the resistance (friction resistance) that occurs between the terminals due to insertion and removal.

In the terminal structure for use in power feeding according to the present embodiment, in contrast, first terminal 21 has the first form at the predetermined temperature in which an outer dimension of tip portion 31 is smaller than an outer dimension of base portion 32 as shown in FIGS. 2 to 5. This configuration makes it possible to minimize the resistance that occurs between first terminal 21 and second terminal 51 due to establishment of connection between first terminal 21 and second terminal 51. Thus, when the temperature of first terminal 21 decreases, this configuration makes it possible to minimize the resistance that occurs between first terminal 21 and second terminal 51 due to separation of first terminal 21 from second terminal 51.

During electric current passage through the terminal structure for use in power feeding and when the temperature of first terminal 21 exceeds the predetermined temperature, first terminal 21 deforms into the second form in which an outer dimension of tip portion 31 is larger than the outer dimension of tip portion 31 of the first form as shown in FIGS. 6 and 7. This configuration increases the area of contact between first terminal 21 and second terminal 51. In addition, this configuration allows expansion of tip portion 31 outwardly in a radial direction about central axis 101 and thereby makes it possible to increase contact pressure between first terminal 21 and second terminal 51 (namely, to bring first terminal 21 and second terminal 51 into strong contact with each other). This enhances the adhesion between first terminal 21 and second terminal 51 and thereby further increases the area of contact between first terminal 21 and second terminal 51.

These phenomena make it possible to ensure a sufficient amount of area of contact between first terminal 21 and second terminal 51 during electric current passage. When the area of contact between first terminal 21 and second terminal 51 is thus increased, electrical resistance between first terminal 21 and second terminal 51 is reduced and thereby heat production is mitigated. Then, thermal resistance is also reduced to achieve an excellent heat dissipation.

Next, a more detailed description will be given of the structure of first terminal 21. Referring to FIGS. 2 and 3, tip portion 31 includes an outer circumferential part 36 and an inner circumferential part 37.

Outer circumferential part 36 is tubular. Outer circumferential part 36 has a cylindrical shape having central axis 101A as its central axis. Outer circumferential part 36 is composed of a first metal.

Inner circumferential part 37 is bonded to an interior side of outer circumferential part 36. Inner circumferential part 37 has a pin-like shape having central axis 101A as its central axis. Outer circumferential part 36 and inner circumferential part 37 are concentrically located about central axis 101A. Inner circumferential part 37 is composed of a second metal. The second metal has a coefficient of thermal expansion that is higher than a coefficient of thermal expansion of the first metal. The first metal is a Ni—Fe alloy, for example. The second metal is Cu, for example.

First terminal 21 includes a plurality of slits 33. The plurality of slits 33 extend in a direction of central axis 101A. The plurality of slits 33 extend toward base portion 32 from one end of first terminal 21 that is close to tip portion 31. The plurality of slits 33 extend outwardly from central axis 101A in a radial direction about central axis 101A and penetrate through outer circumferential part 36 and inner circumferential part 37. The plurality of slits 33 are arranged at regular intervals in a circumferential direction around central axis 101A.

The plurality of slits 33 divide outer circumferential part 36 and inner circumferential part 37 in a circumferential direction around central axis 101A into a plurality of sections 41 (41A, 41B, 41C, 41D, 41E, 41F, 41G, 41H). Outer circumferential part 36 and inner circumferential part 37 of each section 41 together form a bimetal that is composed of two metals having different coefficients of thermal expansion bonded to each other.

First terminal 21 includes eight slits 33 in the present embodiment. However, the number of slits 33 may be different from eight.

With this configuration, when the temperature of first terminal 21 exceeds the predetermined temperature during electric current passage through the terminal structure for use in power feeding, outer circumferential part 36 and inner circumferential part 37 thermally expand; and during this thermal expansion, the extent of thermal expansion of inner circumferential part 37 is greater than the extent of thermal expansion of outer circumferential part 36 and, thereby, outer circumferential part 36 and inner circumferential part 37 of each section 41 deform and warp outwardly in a radial direction about central axis 101. This deformation enables first terminal 21 to deform into the second form in which an outer dimension of tip portion 31 is larger than the outer dimension of tip portion 31 of the first form.

Figure 8:
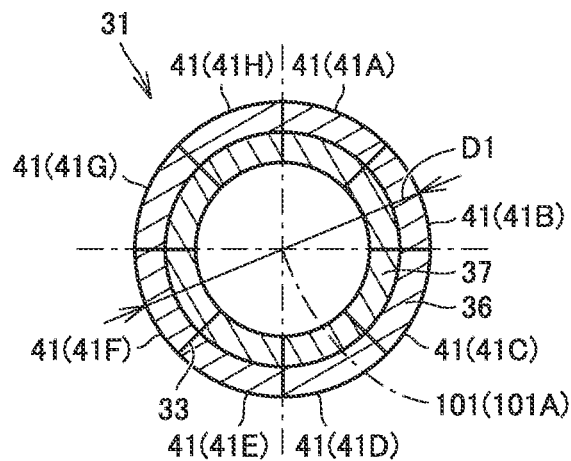
FIG. 8 is a sectional view of a variation of the first terminal.
Figure 9:
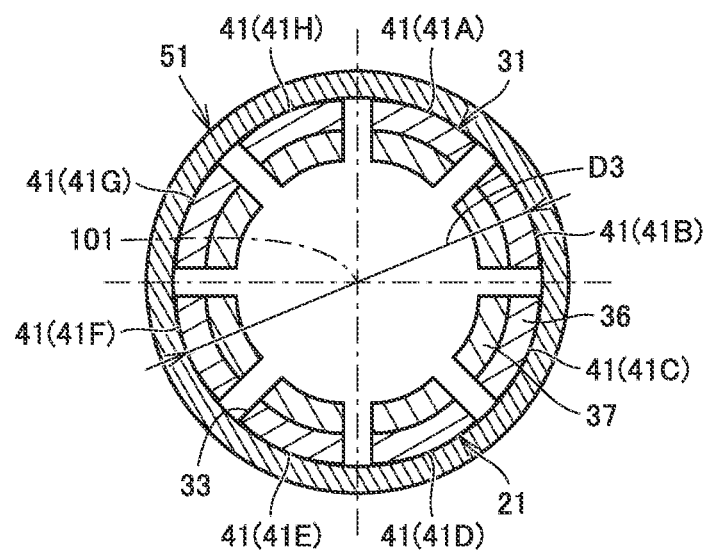
FIG. 9 is a sectional view of the variation of the first terminal.

Each of FIGS. 8 and 9 is a sectional view of a variation of the first terminal. FIG. 8, corresponding to FIG. 3, illustrates a cross section of tip portion 31 of first terminal 21 at the predetermined temperature when first terminal 21 and second terminal 51 are not connected with each other. FIG. 9, corresponding to FIG. 7, illustrates a cross section of first terminal 21 (tip portion 31) and second terminal 51 during electric current passage.

In this variation, referring to FIGS. 8 and 9, first terminal 21 generally has a cylindrical shape having central axis 101A as its central axis. Inner circumferential part 37 has a cylindrical shape having central axis 101A as its central axis. Inner circumferential part 37 is bonded to an interior side of outer circumferential part 36.

Also with this configuration, during electric current passage through the terminal structure for use in power feeding, outer circumferential part 36 and inner circumferential part 37 of each section 41 deform and warp outwardly in a radial direction about central axis 101. This deformation enables first terminal 21 to deform into the second form in which an outer dimension of tip portion 31 is larger than the outer dimension of tip portion 31 of the first form.

Figure 10:
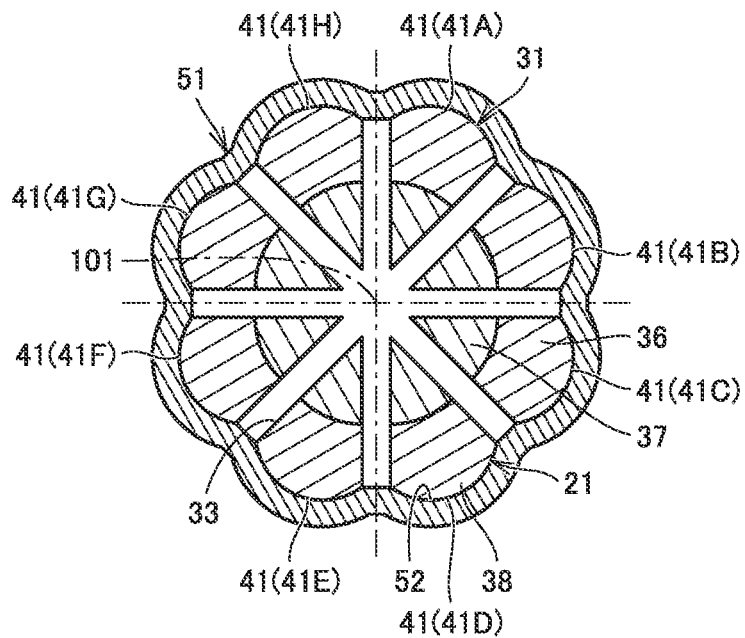
FIG. 10 is a sectional view of another variation of the first terminal and the second terminal.

FIG. 10 is a sectional view of another variation of the first terminal and the second terminal. FIG. 10, corresponding to FIG. 7, illustrates a cross section of first terminal 21 (tip portion 31) and second terminal 51 during electric current passage.

In this variation, referring to FIG. 10, first terminal 21 has a non-circular cross section orthogonal to central axis 101A. More specifically, outer circumferential part 36 of each section 41 at tip portion 31 of first terminal 21 includes a bulging region 38. Bulging region 38 is bulged outwardly in a radial direction about central axis 101A. Second terminal 51 includes a depressed region 52. Depressed region 52 is depressed into an inner circumferential surface of second terminal 51. The depressed contour of depressed region 52 correlates with the projected contour of bulging region 38.

As is clear based on this variation, the shape of the cross section of the first terminal according to the present disclosure orthogonal to an axial direction thereof is not limited to a circular shape. This variation has a further effect that the area of contact between first terminal 21 and second terminal 51 is further increased.

Figure 11:
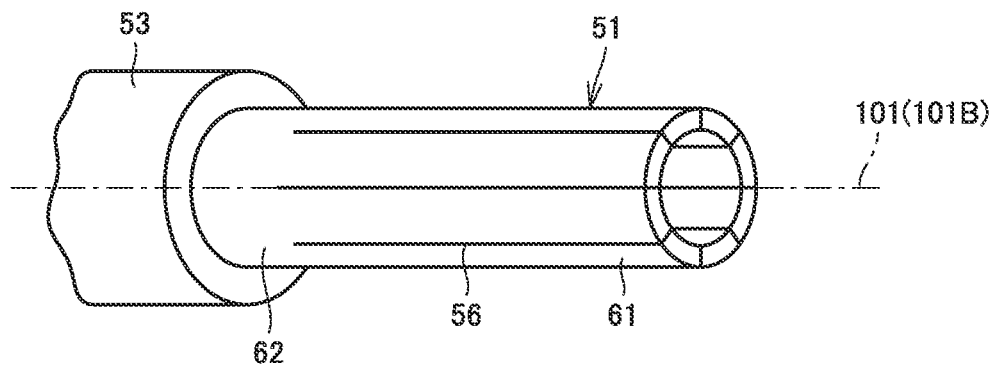
FIG. 11 illustrates a further variation of the second terminal.
Figure 12:
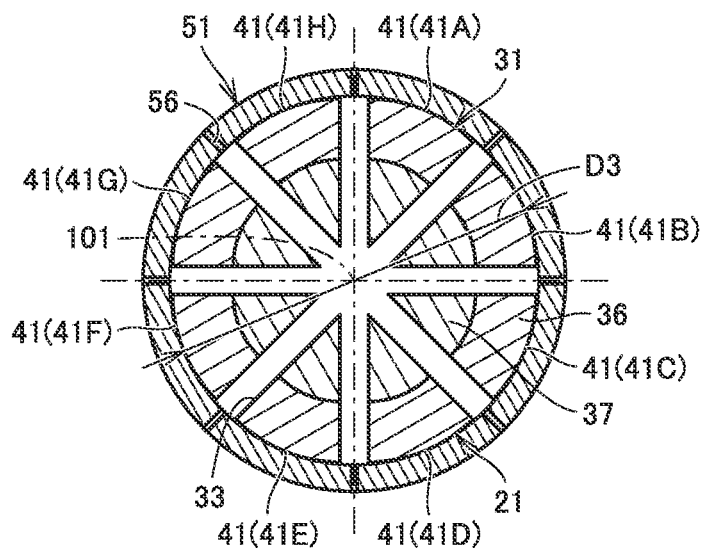
FIG. 12 illustrates the further variation of the second terminal.

Each of FIGS. 11 and 12 illustrates a further variation of the second terminal. FIG. 11 is a perspective view of second terminal 51 alone. FIG. 12, corresponding to FIG. 7, is a sectional view of first terminal 21 (tip portion 31) and second terminal 51 during electric current passage.

In this variation, referring to FIGS. 11 and 12, second terminal 51 includes a plurality of slits 56. The plurality of slits 56 extend in a direction of central axis 101B. The plurality of slits 56 extend toward base portion 62 from one end of second terminal 51 that is close to tip portion 61. The plurality of slits 56 are arranged at regular intervals in a circumferential direction around central axis 101B.

With this configuration, when tip portion 31 of first terminal 21 deforms and warps outwardly in a radial direction about central axis 101 during electric current passage through the terminal structure for use in power feeding, second terminal 51 readily deforms to fit the outer shape of tip portion 31 of first terminal 21. This deformation makes it possible to mitigate partial contact of tip portion 31 of first terminal 21 with the inner circumferential surface of second terminal 51 and, thereby, increase the area of contact between first terminal 21 and second terminal 51.

A summary will be given of the terminal structure for use in power feeding according to Embodiment 1. The terminal structure for use in power feeding according to the present embodiment includes first terminal 21. First terminal 21 includes base portion 32 and tip portion 31. First terminal 21 has a shape extending from base portion 32 to tip portion 31 along its axis. First terminal 21 is insertable into and removable from second terminal 51, which is tubular. At the predetermined temperature, first terminal 21 has the first form in which an outer dimension of tip portion 31 is smaller than an outer dimension of base portion 32 when viewed in a direction of a central axis of first terminal 21. When the temperature of first terminal 21 exceeds the predetermined temperature, first terminal 21 deforms into the second form in which an outer dimension of tip portion 31 is larger than the outer dimension of tip portion 31 of the first form when viewed in a direction of the central axis of first terminal 21.

The terminal structure for use in power feeding according to Embodiment 1 with this configuration makes it possible to minimize the resistance that occurs between first terminal 21 and second terminal 51 due to insertion and removal while ensuring a sufficient amount of area of contact between first terminal 21 and second terminal 51 during electric current passage.

Embodiment 2

Figure 13:
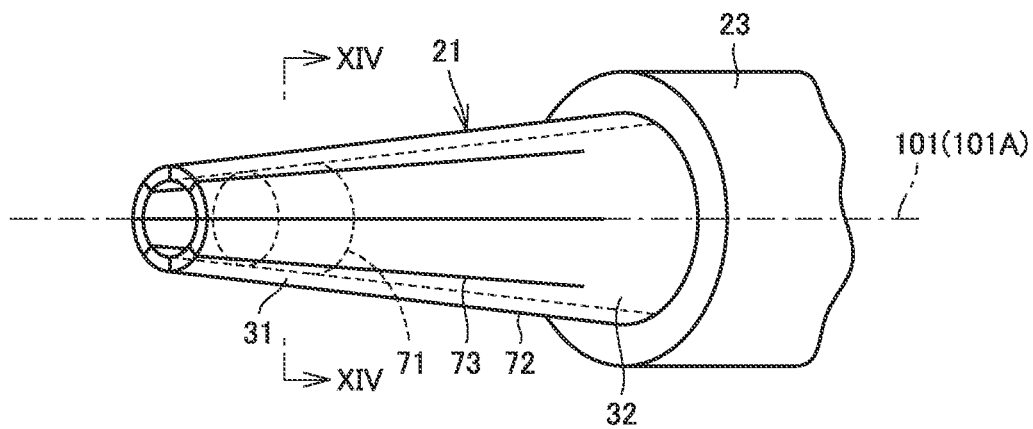
FIG. 13 is a perspective view of a terminal structure for use in power feeding according to Embodiment 2.
Figure 14:
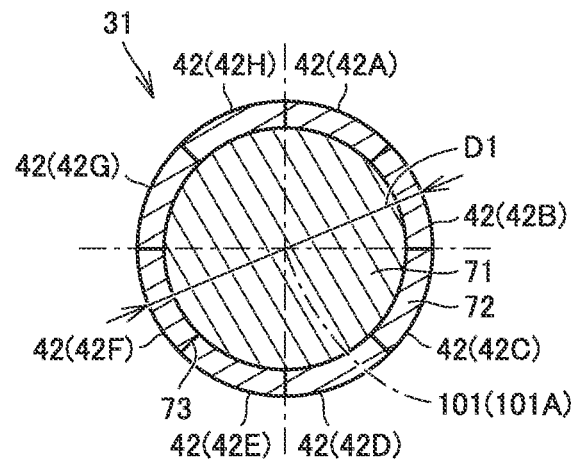
FIG. 14 is a sectional view of the first terminal along the line XIV-XIV shown in FIG. 13 and viewed in a direction indicated by the arrows shown in FIG. 13.
Figure 15:
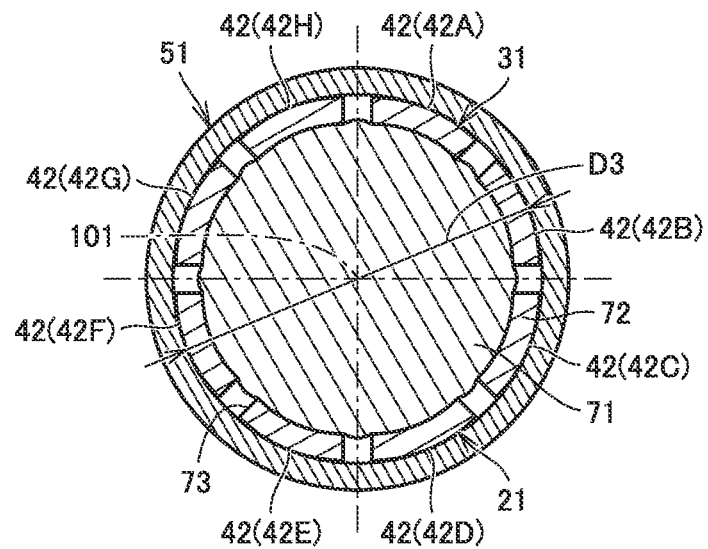
FIG. 15 is a perspective view of the terminal structure for use in power feeding according to Embodiment 2 (during electric current passage).

FIG. 13 is a perspective view of a terminal structure for use in power feeding according to Embodiment 2. FIG. 13 illustrates first terminal 21 that is not connected with second terminal 51. FIG. 14 is a sectional view of the first terminal along the line XIV-XIV shown in FIG. 13 and viewed in a direction indicated by the arrows shown in FIG. 13. FIG. 15 is a perspective view of the terminal structure for use in power feeding according to Embodiment 2 (during electric current passage).

The terminal structure for use in power feeding according to the present embodiment is different from the terminal structure for use in power feeding according to Embodiment 1 in the mechanism of deformation of tip portion 31 of first terminal 21 during electric current passage. Regarding the structural characteristics the same as those in Embodiment 1, description thereof will not be repeated.

Referring to FIGS. 13 to 15, tip portion 31 includes an outer circumferential part 72 and an inner circumferential part 71. Outer circumferential part 72 is tubular. Outer circumferential part 72 has a cylindrical shape having central axis 101A as its central axis. Outer circumferential part 72 is configured to be deformable in a radial direction about central axis 101A.

More specifically, first terminal 21 includes a plurality of slits 73. The plurality of slits 73 extend in a direction of central axis 101A. The plurality of slits 73 extend toward base portion 32 from one end of first terminal 21 that is close to tip portion 31. The plurality of slits 73 are arranged at regular intervals in a circumferential direction around central axis 101A.

The plurality of slits 73 divide outer circumferential part 72 in a circumferential direction around central axis 101A into a plurality of sections 42 (42A, 428, 42C, 42D, 42E, 42F, 42G, 42H).

Inner circumferential part 71 is located on an interior side of outer circumferential part 72. Inner circumferential part 71 is in the shape of a circular truncated cone having central axis 101A as its central axis. Inner circumferential part 71 is configured to have its volume progressively increasing outwardly in a radial direction about central axis 101A along with a rise in temperature. Inner circumferential part 71 is made of a resin that thermally expands along with a rise in temperature.

With this configuration, when the temperature of first terminal 21 exceeds the predetermined temperature during electric current passage through the terminal structure for use in power feeding, inner circumferential part 71 thermally expands. When this occurs, the thermally expanding inner circumferential part 71 force opens outer circumferential part 72 outwardly in a radial direction about central axis 101. This phenomenon enables first terminal 21 to deform into the second form in which an outer dimension of tip portion 31 is larger than the outer dimension of tip portion 31 of the first form.

In the present disclosure, the structure that enables deformation of the outer circumferential part in a radial direction about the central axis of the first terminal is not particularly limited. For instance, outer circumferential part 72 may have a spiral shape extending in a direction of central axis 101A and thereby be deformable to enlarge or shrink in a radial direction about central axis 101A.

Figure 16:
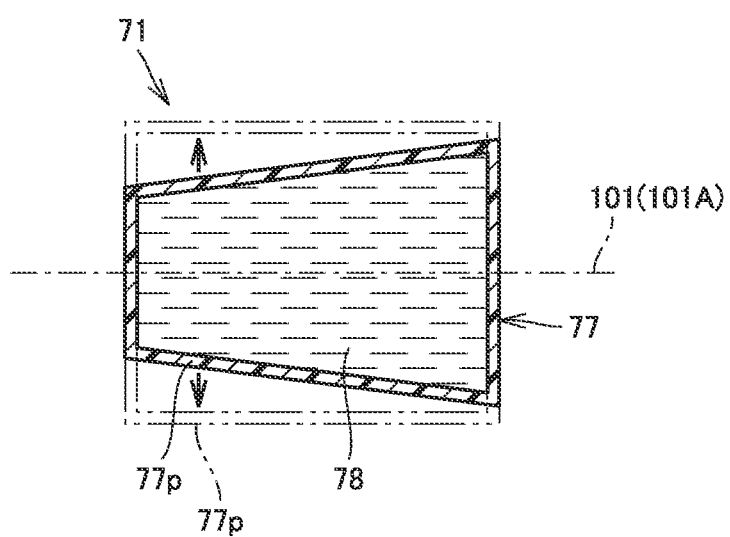
FIG. 16 is a sectional view of a variation of the inner circumferential part shown in FIG. 13.

FIG. 16 is a sectional view of a variation of the inner circumferential part shown in FIG. 13. In FIG. 16, inner circumferential part 71 of first terminal 21 of the first form is represented by a solid line and inner circumferential part 71 of first terminal 21 of the second form is represented by a dash-dot-dot line.

Referring to FIG. 16, inner circumferential part 71 includes a container 77 and a fluid 78. Container 77 consists of a pouch that is elastically deformable in a radial direction about central axis 101A. Fluid 78 is a gas or liquid that increases in volume along with a rise in temperature. For example, fluid 78 is a refrigerant used in a refrigerator or is water. Fluid 78 is accommodated in container 77.

With this configuration, when the temperature of first terminal 21 exceeds the predetermined temperature and the volume of fluid 78 increases during electric current passage through the terminal structure for use in power feeding, container 77 deforms outwardly in a radial direction about central axis 101. When this occurs, a peripheral wall 77p of container 77 force opens outer circumferential part 72 outwardly in a radial direction about central axis 101. This phenomenon enables first terminal 21 to deform into the second form in which an outer dimension of tip portion 31 is larger than the outer dimension of tip portion 31 of the first form.

The terminal structure for use in power feeding according to Embodiment 2 with this configuration is capable of exhibiting an effect similar to the effect described regarding Embodiment 1.

The present disclosure is applicable to, for example, a connector and/or a plug used for connecting a vehicle with a power-feeding facility.

The embodiments and examples disclosed herein are illustrative and non-restrictive in any respect. The technical scope indicated by the claims encompasses any modifications within the scope and meaning equivalent to the terms of the claims.

What is claimed is:

1. A terminal structure for use in power feeding, comprising:
   a first terminal; and
   a second terminal;
   the first terminal including a base portion and a tip portion, the first terminal having a shape extending from the base portion to the tip portion along an axis of the first terminal, the first terminal being insertable into and removable from the second terminal, the second terminal being tubular,
   the first terminal having a first form at a predetermined temperature, the first form being a form in which an outer dimension of the tip portion is smaller than an outer dimension of the base portion when viewed in a direction of a central axis of the first terminal,
   the first terminal being configured to deform into a second form when a temperature of the first terminal exceeds the predetermined temperature, the second form being a form of the first terminal in which an outer dimension of the tip portion is larger than the outer dimension of the tip portion of the first form when viewed in a direction of the central axis of the first terminal.

2. The terminal structure for use in power feeding according to claim 1, wherein the tip portion includes:
  an outer circumferential part, the outer circumferential part being tubular and being composed of a first metal; and
  an inner circumferential part bonded to an interior side of the outer circumferential part, the inner circumferential part being composed of a second metal, the second metal having a coefficient of thermal expansion higher than a coefficient of thermal expansion of the first metal,
  the first terminal includes a plurality of slits extending in a direction of the central axis of the first terminal, and
  the plurality of slits divide the outer circumferential part and the inner circumferential part in a circumferential direction around the central axis of the first terminal into a plurality of sections.

3. The terminal structure for use in power feeding according to claim 1, wherein the tip portion includes:
  an outer circumferential part, the outer circumferential part being tubular and being deformable in a radial direction about the central axis of the first terminal; and
  an inner circumferential part located on an interior side of the outer circumferential part, the inner circumferential part having a volume progressively increasing outwardly in a radial direction about the central axis of the first terminal along with a rise in temperature.

4. The terminal structure for use in power feeding according to claim 1, wherein
  when the first terminal connected with the second terminal is deformed into the second form, the tip portion comes into contact with an inner circumferential surface of the second terminal.

5. The terminal structure for use in power feeding according to claim 4, wherein the second terminal includes a plurality of slits, and the plurality of slits extend in a direction of a central axis of the second terminal and are arranged in a circumferential direction around the central axis of the second terminal.

6. A terminal structure for use in power feeding, comprising:
  a first terminal; and
  a second terminal;
  the first terminal including a base portion and a tip portion, the first terminal having a shape extending from the base portion to the tip portion along an axis of the first terminal, the first terminal being insertable into and removable from the second terminal,
  the first terminal having a first form at a predetermined temperature, the first form being a form in which an outer dimension of the tip portion is smaller than an outer dimension of the base portion when viewed in a direction of a central axis of the first terminal,
  the first terminal being configured to deform into a second form when a temperature of the first terminal exceeds the predetermined temperature, the second form being a form of the first terminal in which an outer dimension of the tip portion is larger than the outer dimension of the tip portion of the first form when viewed in a direction of the central axis of the first terminal,
  wherein electric current is passable through a contact between the first terminal and the second terminal.

7. The terminal structure for use in power feeding according to claim 6, wherein the second terminal is tubular.

8. The terminal structure for use in power feeding according to claim 7, wherein the tip portion includes:
  an outer circumferential part, the outer circumferential part being tubular and being composed of a first metal; and
  an inner circumferential part bonded to an interior side of the outer circumferential part, the inner circumferential part being composed of a second metal, the second metal having a coefficient of thermal expansion higher than a coefficient of thermal expansion of the first metal,
  the first terminal includes a plurality of slits extending in a direction of the central axis of the first terminal, and
  the plurality of slits divide the outer circumferential part and the inner circumferential part in a circumferential direction around the central axis of the first terminal into a plurality of sections.

9. The terminal structure for use in power feeding according to claim 7, wherein
  the tip portion includes:
    an outer circumferential part, the outer circumferential part being tubular and being deformable in a radial direction about the central axis of the first terminal; and
    an inner circumferential part located on an interior side of the outer circumferential part, the inner circumferential part having a volume progressively increasing outwardly in a radial direction about the central axis of the first terminal along with a rise in temperature.

10. The terminal structure for use in power feeding according to claim 7, wherein
  when the first terminal connected with the second terminal is deformed into the second form, the tip portion comes into contact with an inner circumferential surface of the second terminal.

11. The terminal structure for use in power feeding according to claim 10, wherein the second terminal includes a plurality of slits, and the plurality of slits extend in a direction of a central axis of the second terminal and are arranged in a circumferential direction around the central axis of the second terminal.

* * * * *